May 6, 1947.　　　　G. L. DIMMICK　　　　2,420,168
ACHROMATIC LIGHT REFLECTING AND TRANSMITTING FILM
Filed Dec. 23, 1943
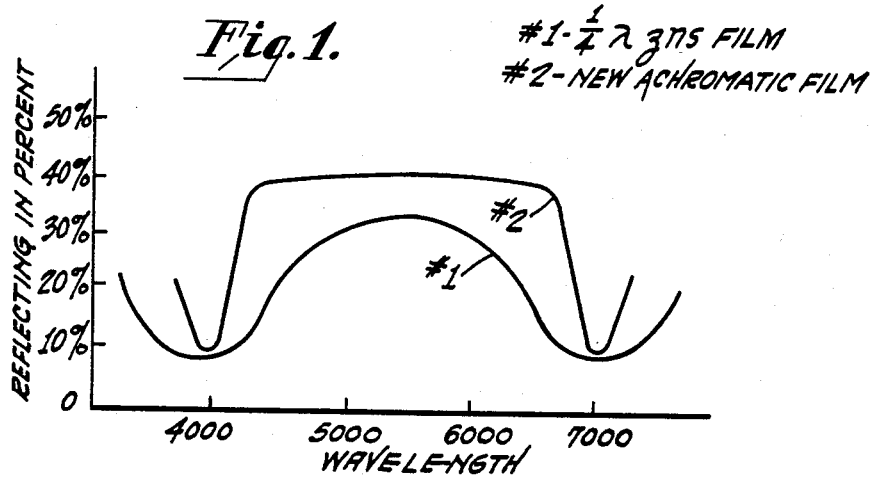
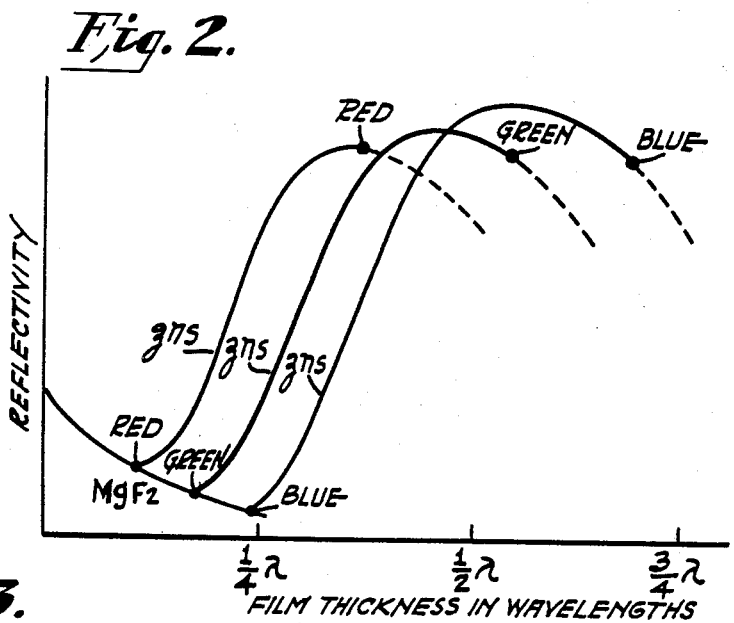
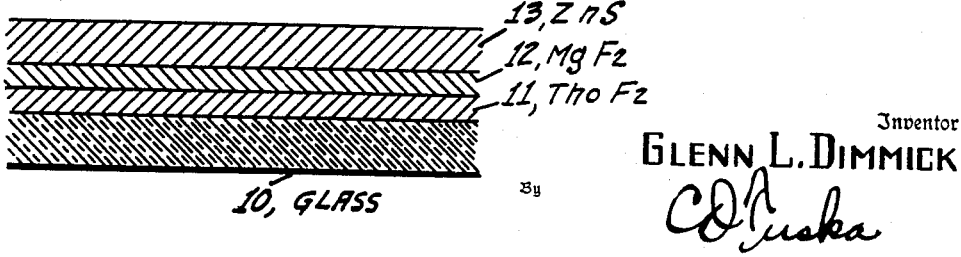
Inventor
GLENN L. DIMMICK
By
Attorney Patented May 6, 1947

2,420,168

UNITED STATES PATENT OFFICE 2,420,168

ACHROMATIC LIGHT REFLECTING AND TRANSMITTING FILM

Glenn L. Dimmick, Indianapolis, Ind., assignor to Radio Corporation of America, a corporation of Delaware Application December 23, 1943, Serial No. 515,402

6 Claims. (Cl. 88—1)

This invention relates to a partially transmitting film produced of completely transmitting materials and in such relation that the result will be substantially achromatic partial transmission of light.

Heretofore partially transmitting films were produced by thinly metallizing glass or some other transparent medium. For example, half-silvered mirrors are quite old in the art and they transmit approximately the amount of light that is reflected but the loss of light runs quite high, about 40 percent. Aluminized mirrors have more recently come into common use and can likewise be made partially transmitting with approximately equal transmission and reflection. The loss of light in this instance runs approximately 50 percent. Both the silver and aluminum mirrors are quite soft and easily damaged, and the silver mirrors are rapidly converted to silver sulphide, losing both their reflecting and transmitting power, whereas the aluminum reflectors are gradually converted to aluminum oxide with more or less the same result.

In my present reflector the transparent support is coated with several layers of transparent material such as thorium oxifluoride, magnesium fluoride, and zinc sulphide in proper ratios of thickness so that the required reflecting and transmission ability is accomplished without any appreciable loss of light and the film is relatively hard and not affected by the atmosphere.

One object of the invention is to provide a partially reflecting film which is substantially achromatic.

Another object of the invention is to provide a partially transmitting film which is substantially achromatic.

Another object of the invention is to provide a partially reflecting and partially transmitting film which functions without any appreciable light loss.

Another object of the invention is to provide a partially reflecting and partially transmitting film which is not subject to the effects of corrosion.

Another object of the invention is to provide a partially reflecting and partially transmitting film which is not affected by the atmosphere.

Other and incidental objects of the invention will be apparent from a reading of the following specification and an inspection of the accompanying drawings in which:

Figure 1 is a curve showing the reflecting characteristics of my improved film.

Figure 2 is a group of curves showing the reflection characteristics of the magnesium fluoride and zinc sulphide coating employed, and Figure 3 is a greatly enlarged section of my improved film.

Referring first to Fig. 3, a supporting member, for example, of glass, is indicated at 10. Usually a supporting member will be most conveniently of glass, but other materials may also be used. On the supporting member there is a thin layer 11 of thorium oxi-fluoride produced in a manner described and claimed in my application, Serial 464,018, filed October 31, 1942. On the layer of thorium oxi-fluoride is applied a layer 12 of magnesium fluoride and on the layer of magnesium fluoride is applied a layer 13 of zinc sulphide.

The thickness of the aforesaid layers must be approximately accurate. The thickness of the layers may be measured as described and claimed in my application, Serial 372,811, filed January 2, 1941, entitled "Evaporation of transparent material on glass" (now Patent No. 2,338,234). In the present instance it is most convenient to use a control angle of 45° and an ultra-violet filter, for example a filter composed of Corning No. 986 glass.

As an example, starting with the glass as 100 percent reflection, the $ThOF_2$ layer 11 is applied until the reflection becomes 90 percent. Then the $MgF_2$ layer 12 is applied until the reflection is 30 percent and the color by reflection is light yellow. Then the zinc sulphide layer 13 is applied and the reflection first falls to a minimum of about 20 percent producing an orange color by reflection, and then the zinc sulphide layer is continued to be applied until it reaches a maximum reflection of approximately 850 percent which will give a blue-white appearance, and the zinc sulphide is continued to be applied until it reaches approximately 500 percent transmission with a white color by reflection. This color is very slightly bluish by reflection and very slightly yellowish by transmission.

This film then gives the following percent transmissions with the filters indicated:

|  | Per cent |
|---|---|
| Red | 62 |
| Blue | 60 |
| Green | 58 |

This applies to one particular film.

By increasing or decreasing the thickness of the ZnS layer, the transmission vs color curve can be tipped so that the red transmission is higher than the blue or vice-versa. The data below represents about the nearest approach to an achromatic film obtained so far by this method. This appears achromatic to the eye.

| | Per cent |
|---|---|
| Red, 6500 A | 61 |
| Green, 5500 A | 58 |
| Blue, 4400 A | 61 |

It will be apparent that the films above described constitute a type of interferometer and operate in accordance with the known laws of interference. These films do not exhibit fringes nor do they otherwise separate the light for the reasons hereinafter described.

Referring to Fig. 2, the thorium oxi-fluoride is primarily deposited to render a tenacious coating on the glass and a coating to which the magnesium fluoride will adhere strongly. It does not materially enter into the interference effects because its refractive index is near that for glass. The magnesium fluoride coating is deposited to a thickness, as indicated in Fig. 2, of approximately one-quarter of a wavelength for blue light. The zinc sulphide film is then applied, and by following the line marked "blue" in Fig. 2 from the point where it joins the MgF₂ deposition curve it will be apparent that this film is applied until the reflection of the blue reaches a maximum at one-quarter wavelength and then the film is continued to be deposited until the reflection of the blue light falls off to about 40 percent at a little less than three-eighths wavelength. At the same time the green light, for which the reflectivity was not decreased as much by the magnesium fluoride, has increased to a maximum and fallen off until the reflection for the green light is approximately that for the blue light. The reflection for the red light, which was much less decreased by the magnesium fluoride coating, is indicated on the curve marked "red" and the zinc sulphide coating increases the reflection for the red light until it reaches the maximum, which is at approximately the same percentage of reflection as for the green and blue colors.

The accepted representative wave lengths of blue and red light are 4700 and 6700 A., respectively. The zinc sulphide film, therefore, having a thickness of somewhat less than three-eighths of a wave length of blue light is equal to approximately 1700 A., and may also be regarded as having a thickness of one-quarter of a wave length of red light.

Referring now to Fig. 1, the curve No. 1 shows a reflectivity in percent for a zinc sulphide film on glass having a thickness of one-quarter of a wavelength at 5500 A. It will be noted that if the reflectivity is a minimum at 4000 angstroms, a maximum of a little over 30 percent at about 5500, and then falls toward a minimum at about 7000. With my improved film applied as described above the reflectivity is substantially but not exactly constant from nearly 4000 angstroms to nearly 7000 angstroms due to the reflection characteristics of the several colors of light as indicated in Fig. 2. Further descriptions of the reasons for the flattening out of the curve reflection will be found in "Fundamentals of Physical Optics" by Jenkins and White, first edition 1937, at pages 94 to 96.

As pointed out above, the thorium oxi-fluoride does not enter appreciably into the interferometer action and, if desired, the magnesium fluoride may be applied directly to the support and the zinc sulphide then applied to the magnesium fluoride. This film is baked for several hours at about 150° C. It is then durable enough to stand cleaning with a soft cloth or cotton many times without injury. The film is not affected appreciably by water or salt water.

I claim as my invention:

1. A partially transmitting optical element including a transparent support, a transparent base layer of thorium oxi-fluoride on a surface of the support, a layer of magnesium fluoride on the thorium oxi-fluoride, and having a thickness of approximately one-quarter wavelength of blue light and a layer of zinc sulphide on the magnesium fluoride having a thickness of approximately three-eighths of a wavelength of blue light, the layer of thorium oxifluoride having negligible thickness by comparison with said other layers.

2. A partially transmitting optical element including a transparent support, a layer of magnesium fluoride on a surface of the support and having a thickness of approximately one-quarter wavelength of blue light and a layer of zinc sulphide on the magnesium fluoride having a thickness of approximately three-eighths of a wavelength of blue light.

3. In a partially transmitting optical element including a transparent support, a partially transmitting film on a surface of the support, the film including a layer of material having an index of refraction substantially lower than that of said support and an effective optical thickness of one-quarter of the wave length of blue light and a transparent layer superposed thereon of material having an index of refraction substantially higher than that of said support and an effective optical thickness of one-quarter of the wave length of red light, the film thicknesses and indices of refraction of the materials being such that a substantially achromatic element is produced.

4. The combination according to claim 3, characterized by the addition of a transparent base layer of thorium oxifluoride between said surface and said low index layer, and having negligible thickness by comparison with said low and high index layers.

5. The combination according to claim 3, in which said low index layer is of magnesium fluoride.

6. The combination according to claim 3, in which said high index layer is of zinc sulphide.

GLENN L. DIMMICK.

REFERENCES CITED

The following references are of record in the file of this patent:

UNITED STATES PATENTS

| Number | Name | Date |
|---|---|---|
| 2,289,054 | Dimmick | July 7, 1942 |
| 2,281,474 | Cartwright et al. | Apr. 28, 1942 |
| 1,425,967 | Hoffman | Aug. 15, 1922 |
| 2,349,457 | Osterberg | May 23, 1944 |
| 2,252,770 | Janes | Aug. 19, 1941 |
| 2,220,861 | Blodgett | Nov. 5, 1940 |
| 2,207,656 | Cartwright | July 9, 1940 |
| 2,366,687 | Osterberg | Jan. 2, 1945 |

OTHER REFERENCES

Cartwright et al., article in Bulletin of American Phy. Soc., vol. 14, p. 24, Apr. 12, 1939. (Typed copy in 88–1 R & R.)

Troutman, article in J. O. S. A., vol. 32, Oct. 1942. (Photostat copy in 88–1 (R & R), p. 631 (article 3).)